(12) United States Patent
Bonilla et al.

(10) Patent No.: US 9,227,643 B1
(45) Date of Patent: Jan. 5, 2016

(54) WHEELED TRANSPORT FOR SLOW COOKER

(71) Applicants: Jacqueline P. Bonilla, Parrish, FL (US); Carlos A. Bonilla, Parrish, FL (US)

(72) Inventors: Jacqueline P. Bonilla, Parrish, FL (US); Carlos A. Bonilla, Parrish, FL (US)

(*) Notice: Subject to any disclaimer, the term of this patent is extended or adjusted under 35 U.S.C. 154(b) by 0 days.

(21) Appl. No.: 14/281,270

(22) Filed: May 19, 2014

Related U.S. Application Data

(60) Provisional application No. 61/928,633, filed on Jan. 17, 2014.

(51) Int. Cl.
*B62B 1/04* (2006.01)

(52) U.S. Cl.
CPC ........................ *B62B 1/047* (2013.01)

(58) Field of Classification Search
CPC ............ A45C 5/14; A45C 5/03; A45C 13/02; A45C 13/26; A45C 5/06; A45C 13/001
USPC .......... 280/655.1, 655, 79.5, 47.26, 37, 47.19
See application file for complete search history.

(56) References Cited

U.S. PATENT DOCUMENTS

| | | | |
|---|---|---|---|
| 3,512,621 A * | 5/1970 | Teetor | 206/287 |
| 4,411,343 A | 10/1983 | Cassimally et al. | |
| 4,544,051 A * | 10/1985 | Saltz | 190/124 |
| 4,724,681 A | 2/1988 | Bartholomew et al. | |
| 5,116,289 A | 5/1992 | Pond et al. | |
| 5,169,164 A | 12/1992 | Bradford | |
| 5,294,137 A | 3/1994 | Barber et al. | |
| 5,294,145 A | 3/1994 | Cheng | |
| 5,511,682 A * | 4/1996 | Pace | 280/47.26 |
| 5,575,362 A * | 11/1996 | Franklin et al. | 190/115 |
| 5,683,097 A | 11/1997 | Fenton et al. | |
| 5,762,170 A * | 6/1998 | Shyr et al. | 190/109 |
| 5,967,270 A * | 10/1999 | Shyr | 190/109 |
| 7,140,635 B2 | 11/2006 | Johnson et al. | |
| 7,147,243 B2 * | 12/2006 | Kady | 280/655 |
| 7,232,018 B1 * | 6/2007 | Salander | 280/37 |
| D552,349 S * | 10/2007 | Greiner | D3/279 |
| D566,964 S * | 4/2008 | Greiner | D3/293 |
| 7,614,628 B2 | 11/2009 | O'Connor | |
| 8,181,974 B1 * | 5/2012 | Galvan et al. | 280/79.5 |
| 2007/0278755 A1 * | 12/2007 | Jack | 280/37 |

* cited by examiner

*Primary Examiner* — Hau Phan
(74) *Attorney, Agent, or Firm* — Robert C. Montgomery; Montgomery Patent & Design, LP

(57) ABSTRACT

An apparatus for transporting a container includes a lower enclosure adapted to accept and retain the container, an insulating lining disposed on an inner surface of the lower enclosure, an upper enclosure hingedly affixed to the lower enclosure and adapted to close upon and seal the lower enclosure, a handle assembly attached to the lower enclosure, and at least one pair of wheels operatively attached to a bottom surface of said lower enclosure, wherein the handle assembly is selectively movable between a deployed position and stowed position.

16 Claims, 5 Drawing Sheets

WHEELED TRANSPORT FOR SLOW COOKER

RELATED APPLICATIONS

The present invention was first described in and claims the benefit of U.S. Provisional Application No. 61/928,633, filed Jan. 17, 2014, the entire disclosures of which are incorporated herein by reference.

FIELD OF THE INVENTION

The present invention relates generally to a wheeled transportation device particularly suited for transporting a slow cooker type of food container.

BACKGROUND OF THE INVENTION

Slow cookers or CROCK-POTS® as they are commonly called, are frequently used to make a wide variety of dishes such as stews, chilis, soups, pot roasts, and the like. While these foods are perfect for meals at home, they also find a high percentage of use at picnics, tail gate parties, office functions, and pot luck dinners. These occasions mean that the slow cooker must be transported to a remote location where the cooking process continues, or for keeping the food warm for long periods of time. However, these slow cookers can weigh up to twenty-five pounds (25 lbs.) when filled with food. While they can be easily lifted and carried for a few feet, transport through large parking lots, or carrying into a large building becomes very difficult for even those in the best of physical shape. Those who may be elderly, of a small physical stature, or those suffering from an injury or disability find moving heavy slow cookers impossible. Accordingly, there exists a need for a means by which slow cookers can be easily moved and transported, without the disadvantages as described above.

SUMMARY OF THE INVENTION

The disadvantages of the prior art are overcome by the present invention in providing a wheeled transport for a cooking container having a lower enclosure adapted to accept and retain the container and an upper enclosure hingedly affixed to the lower enclosure and adapted to close upon and seal the lower enclosure. The invention includes a handle assembly selectively movable between a deployed position and stowed position and a pair of wheels operatively attached to the bottom surface of the lower enclosure. The use of the present invention provides a means of moving and transporting heavy, filled, slow cookers, in a manner that is not only quick, easy, and effective, but unique, safe, and secure as well.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
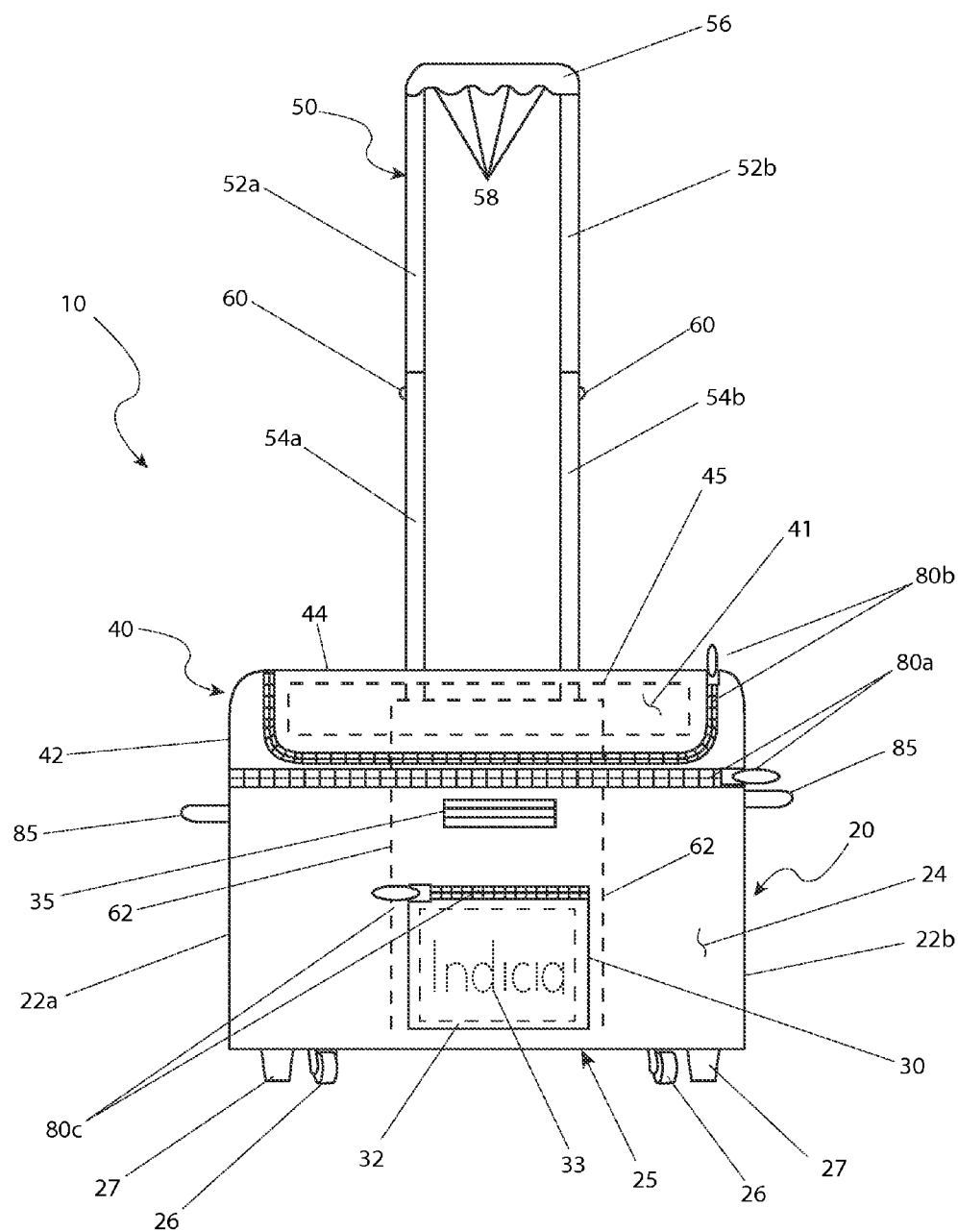
FIG. 1 is a rear view of a wheeled transport for a slow cooker 10, according to a preferred embodiment of the present invention.

DESCRIPTIVE KEY 10 wheeled transport for a slow cooker
20 lower enclosure assembly
21 lower enclosure inner cavity
22a first side panel
22b second side panel
23 front panel
24 rear panel
25 bottom panel
26 caster
27 leg
28 insulation layer
30 pouch
32 document
33 indicia
35 vent
36 hinge
37 cord aperture
40 upper enclosure assembly
41 upper enclosure inner cavity
42 enclosure material
43 upper enclosure base
44 upper enclosure flap
45 utensil tray
46a first compartment
46b second compartment
47 divider wall
50 handle assembly
52a first upper section
52b second upper section
54a first lower section
54b second lower section
56 pull-handle
58 finger relief
60 spring button
62 pull handle case
64 skid plate
70a first side padding block
70b second side padding block
72a front padding block
72b rear padding block
80a first zipper
80b second zipper
80c third zipper
85 stationary handle
90 locking band
92 center aperture
94a first side aperture
94b second side aperture
100 slow cooker
101 slow cooker side handle
102 lid handle
200 user
210 ground/floor surface

DETAILED DESCRIPTION OF THE PREFERRED EMBODIMENT

In accordance with the invention, the best mode is presented in terms of the described embodiments, herein depicted within FIGS. 1 through 5. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for to purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

The present invention describes a wheeled transport (herein described as the "apparatus") 10, which provides a rolling case for containing, securing, and transporting a slow cooker 100 such as a crock pot, or similar cooking device. The apparatus 10 resembles a rolling suitcase-like structure comprising of a rigid plastic or metal lower enclosure assembly 20 and a semi-rigid textile upper enclosure assembly 40 being hingedly attached to each other to form a lower enclosure inner cavity 21 capable of securely containing the slow cooker 100. The apparatus 10 provides a retractable pull-handle assembly 50 and a pair of casters 26 for smooth transportation of the slow cooker 100.

Figure 2:
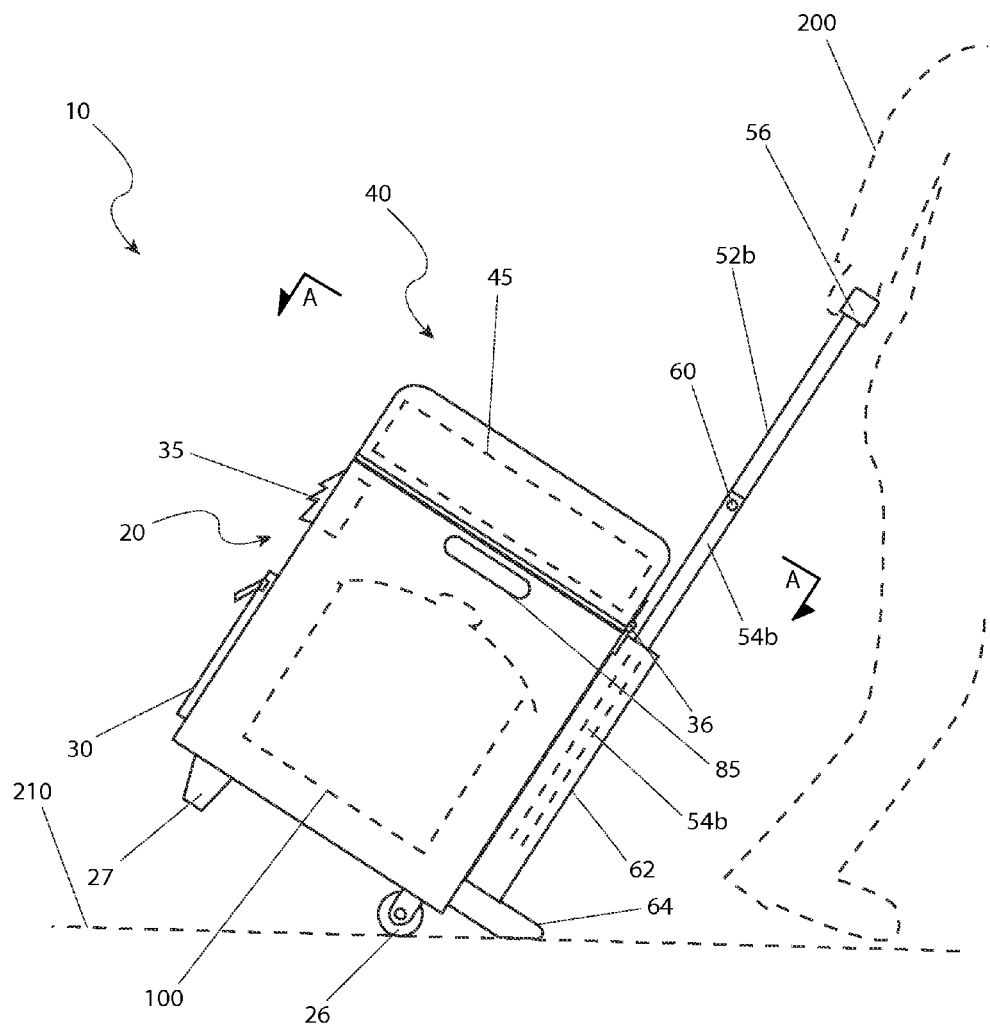
FIG. 2 is a side view of the wheeled transport 10, according to a preferred embodiment of the present invention.

Referring now to FIGS. 1 and 2, rear and side views of the apparatus 10, according to the preferred embodiment of the present invention, are disclosed. The aforementioned lower enclosure assembly 20 provides an open top box-like rigid structure having a first side panel 22a, a second side panel 22b, a front panel 23, a rear panel 24, and a bottom panel 25. The panel portions 22a, 22b, 23, 24, 25 provide a single piece construction of flat plastic or metal panels arranged at right angles, and being covered along all interior surfaces by an insulation layer 28 such as polystyrene or equivalent durable lightweight insulating material envisioned to be adhesively bonded to the panes 22a, 22b, 23, 24, 25. The lower enclosure assembly 20 further includes a pair of hinges 36 along a rear upper edge, and a first zipper 80a which extends along side and front edges which provide respective hinged attachment and closure with specs to the upper enclosure assembly 40. The lower enclosure assembly 20 is envisioned to be introduced in several sizes having lower enclosure inner cavities 21 which facilitate correspondingly sized slow cookers 100, and as such should not be interpreted as a limiting factor of the apparatus 10.

The lower enclosure assembly 20 also includes a louver-type vent 35 and a pouch 30 both built into the rear panel 24. The vent 35 enables escape of expanding gases, steam, and the like, emitted from the slow cooker 100. The rectangular transparent pouch 30 provides a low profile envelope structure having a third zipper 80c along a top edge and is envisioned to be affixed along an outer surface portion of the rear panel 24 using methods such as radio frequency (RF) welding, heat sealing, adhesive bonding, and the like. The pouch 30 is to be suitable in size to contain and display a rectangular document 32 such as a recipe sheet, a menu, or an instruction sheet, as well as different advertisement displays providing various indicia 33.

The lower enclosure assembly 20 provides equipment to enable easy transportation of the apparatus 10 in the slow cooker 100 along a ground/floor surface 210 including a pair of casters 26, a pair of legs 27, and a pull-handle assembly 50. The casters 26 are affixed at front corner portions of the bottom panel 25, and the legs 27 at rear corner portions of the bottom panel 25. The casters 26 and legs 27 are envisioned to have similar vertical heights, thereby enabling the lower enclosure assembly 20 to assume a stable level position upon a ground/floor surface 210 when in an upright position.

The upper enclosure assembly 40 provides a rectangular semi-rigid textile enclosure material 42 affixed to a rigid upper enclosure base 43 that defines a inner cavity 41. The preferred embodiment of the upper enclosure assembly 40 has a similar width and length as the subjacent lower enclosure assembly 20 and is approximately six inches (6 in.) in height. The upper enclosure assembly 40 also provides an upper enclosure flap 44 that is a portion of the enclosure material 42 and operatively opens by a second zipper 80b. Stored beneath the upper enclosure flap 44 within the inner cavity 41 is a utensil tray 45. The zipper 80b allows the flap 44 to be opened across the top of the upper enclosure assembly 40 and along its front face, thereby allowing convenient horizontal extraction of the utensil tray 45 (see FIG. 4). The upper enclosure assembly 40 is hingedly attached to the lower enclosure assembly 20 by the hinges 36.

The handle assembly 50 provides a top horizontal pull-handle portion 56 disposed between two (2) telescoping members each having an upper and lower member that collapse within a handle case 62. More specifically, a first upper section 52a and a second upper section 52b member are insertingly joined to respective a first lower section 54a and a second lower section 54b member. The upper 52a, 52b and lower 54a, 54b members are preferably made using square metal tubing and are secured in an extended state via respective digit-operated spring button devices 60 or an equivalent length-locking mechanism. The pull-handle portion 56 further provides the user with a plurality of integral finger reliefs 58.

The handle assembly 50 provides a means of compact storage via telescoping engagement of the upper 52a, 52b and lower 54a, 54b members. From the deployed position of the handle assembly 50, the user disengaging the spring button devices 60 and providing a downward motion, will cause the desired collapsing and storage of the handle assembly 50 within the handle case 62. With the handle in this stowed position, clearance is provided to open the upper enclosure assembly 40. The upper enclosure assembly 40 is rotated in a forward direction against an exterior surface of the handle case 62, which allows a slow cooker 100 to be loaded into the lower enclosure assembly 20.

During transportation of the apparatus 10, the handle assembly 50 is extracted and the apparatus is tilted forward, thereby lifting the legs 27 from a ground/floor surface 210 and allowing smooth motioning of the apparatus upon the casters 26. The lower enclosure assembly 20 provides at least one (1) skid plate 64 along a bottom edge of the front panel 23 which protrudes in a forward direction and contacts a ground/floor surface 210 in an event that the apparatus is tilted too far forwardly during transportation, thereby protecting against possible spilling of the contents of the slow cooker 100 as seen in FIG. 2.

Figure 3:
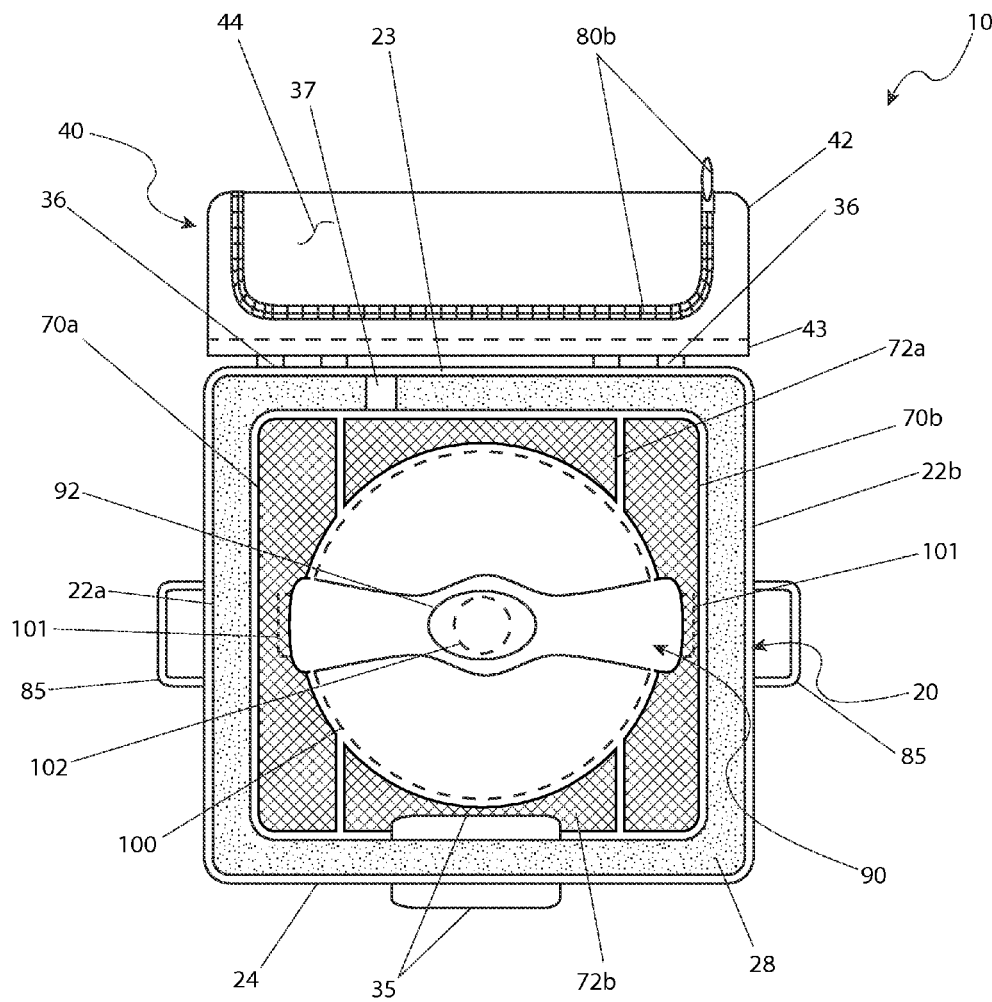
FIG. 3 is a top view of the wheeled transport 10, according to a preferred embodiment of the present invention.
Figure 4:
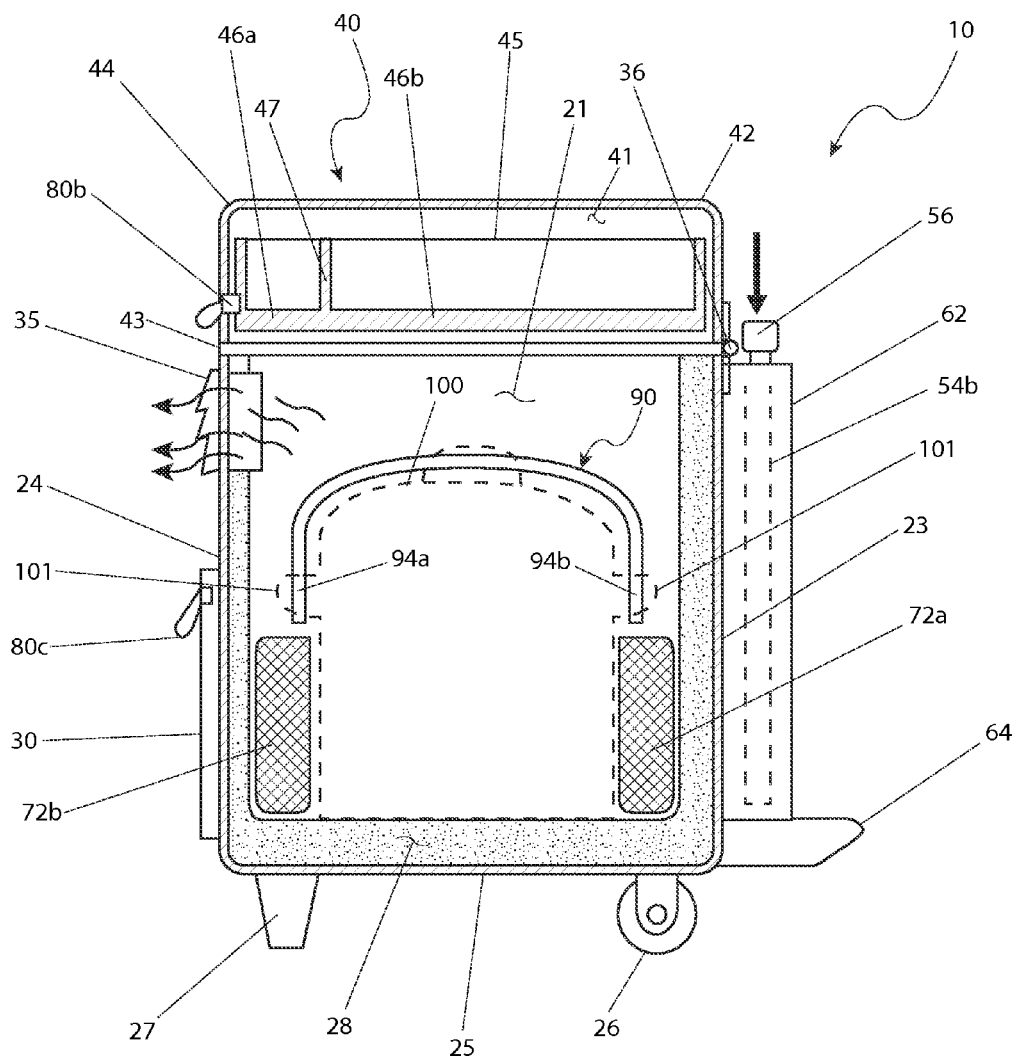
FIG. 4 is a sectional view of the wheeled transport 10 taken along section line A-A (see FIG. 2), according to a preferred embodiment of the present invention.

Referring now to FIGS. 3 and 4, top and sectional interior views of the apparatus 10, according to the preferred embodiment of the present invention, are disclosed. The apparatus 10 provides a means to center and secure the slow cooker 100 within the lower enclosure assembly 20 via insertion of a first side padding block 70a, a second side padding block 70b, a front padding block 72a, and a rear padding block 72b, between the slow cooker 100 and respective first side panel 22a, second side panel 22b, rear panel 24, and front panel 23 portions of the lower enclosure assembly 20. Each padding block 70a, 70b, 72a, 72b provides a generally rectangular shape being approximately six inches (6 in.) in height and made of a dense foam material covered over with vinyl or an equivalent waterproof and easily washable material. The padding blocks 70a, 70b, 72a, 72b provide protective and compliant compressible members which fit snugly between interior surfaces of the lower enclosure assembly 20 and the slow cooker 100, thereby securing the slow cooker 100 in an upright and flat position upon the bottom panel 25. During installation, the compressible nature of each foam padding block 70a, 70b, 72a, 72b enables conformance to the curved outer shape of the slow cooker 100.

The upper enclosure assembly 40 provides an inner space portion to store a plastic or metal utensil tray 45. The utensil tray 45 is envisioned to include a plurality of compartments separated by at least one (1) divider wall 47. In a preferred embodiment, the utensil tray 45 has a first compartment 46a and a second compartment 46b being appropriately sized so as to hold various types of utensils, additional recipe ingredients, or other related items.

The rear panel 24 also provides a half-cylinder-shaped recessed cord aperture 37 along a top edge which allows a user to provide electric power to the slow cooker 100 while being positioned within the apparatus 10, as needed. Interior surfaces of the insulation layer portions 28 of the lower enclosure assembly 20 are envisioned to provide a dark coloring to help hide accidental stains or spills during use of the apparatus 10.

The lower enclosure assembly 20 also provides a means for lifting the apparatus 10 from the ground/floor surface 210 via a pair of stationary "U"-shaped handles 85 envisioned to be integrally-molded into the side panels 22a, 22b at upper center locations.

Figure 5:
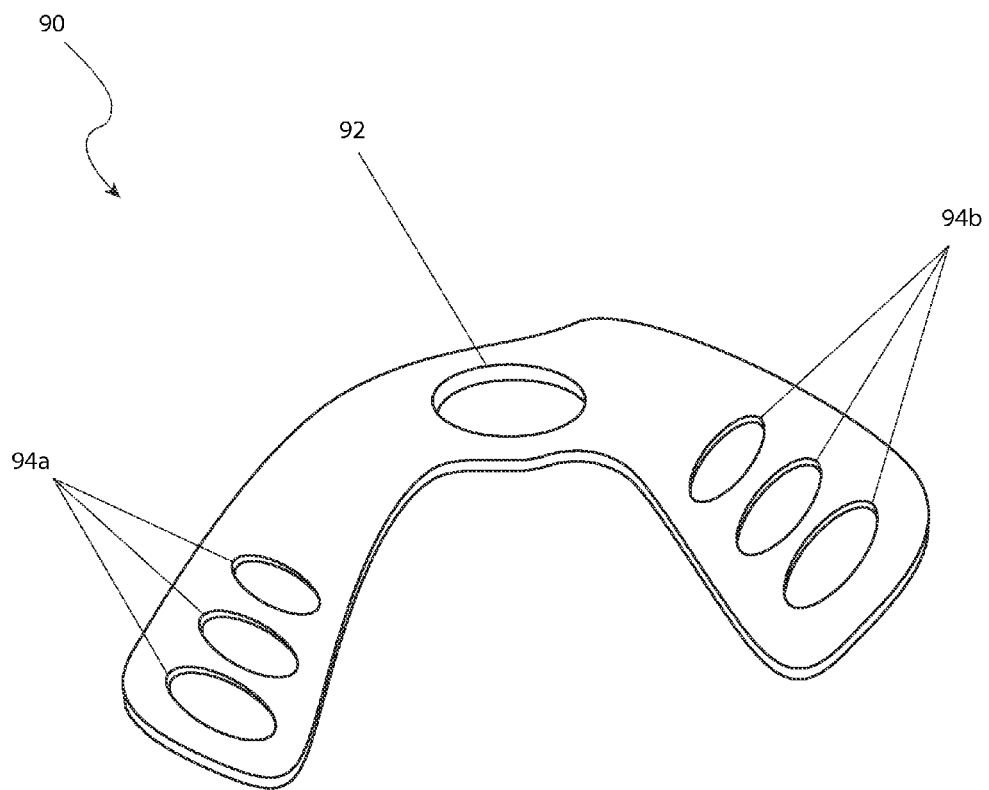
FIG. 5 is a close-up view of a locking band portion 90 of the wheeled transport 10, according to a preferred embodiment of the present invention.

Referring now to FIG. 5, a close-up view of a locking band portion 90 of the apparatus 10, according to a preferred embodiment of the present invention, is disclosed. The apparatus 10 also provides a means to secure a lid handle portion 102 of the slow cooker 100 via the locking band 90. The locking band 90 provides an elastic rubber or plastic strap-like device having a center aperture 92, a plurality of first side apertures 94a, and a plurality of second side apertures 94b. The round center aperture 92 acts to encompass an upper lid handle portion 102 of the slow cooker 100 while the elliptical side apertures 94a, 94b, located at opposing end portions of the locking band 90, encompass opposing slow cooker side handle portions 101. The plurality of side apertures 94a, 94b enable use of the locking band 90 upon different sized slow cookers 100 having differently side handle portions 101. Once installed, the locking band 90 securely retains the lid and vessel portions of the slow cooker 100 together.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be configured and utilized as indicated in FIGS. 2, 3, and 4.

The method of preparing the apparatus 10 for use may be achieved by performing the following steps: procuring a model of the apparatus 10 having a lower enclosure inner cavity 21 which corresponds to an anticipated slow cooker 100 to be transported; transporting the apparatus 10 to a food-loading location by extending the pull handle assembly 50 by grasping the pull-handle portion 56 by integral finger reliefs 58; extending the upper 52a, 52b and lower 54a, 54b sections of the pull handle assembly 50 until the spring buttons 60 are engaged and locked; tilting the apparatus 10 forwardly to lift the legs 27 off of the ground/floor surface 210; rolling the apparatus 190 across the ground/floor surface 210 upon the casters 26 to the food-loading location; returning the apparatus 10 to an upright position upon the casters 26 and legs 27; collapsing the pull-handle assembly 50 by pressing inwardly upon the spring buttons 60; pressing downwardly upon the pull-handle 56 until the pull handle assembly 50 is collapsed into the pull handle case 62; releasing the upper enclosure assembly 40 from the lower enclosure assembly 20 by opening the first zipper 80a; pivoting the upper enclosure assembly 40 upward and rearward about the hinges 36 to expose the lower enclosure inner cavity 21 portion of the lower enclosure assembly 20; loading a slow cooker 100 such as a CrockPot® or other food preparation vessel with foodstuffs, as desired, in a conventional manner; securing lid and body portions of the slow cooker 100 together using the locking band 90 by placing the center aperture portion 92 of the locking band 90 over the lid handle 102; stretching the locking band 90 downwardly over side portions of the slow cooker 100; placing opposing first side aperture 94a and second side aperture 94b portions over corresponding slow cooker handles 101; placing the slow cooker 100 within the lower enclosure assembly 20; centering the slow cooker 100 upon the bottom panel portion 25; inserting and compressing the side padding blocks 70a, 70b between side services of the slow cooker 100 and the side panel portions 22a, 22b of the lower enclosure assembly 20; inserting and compressing the front padding block 72a and rear padding block 72b portions along front and rear surface portions of the slow cooker 100; replacing the upper enclosure assembly 40 upon the lower enclosure assembly 20 and fastening using the first zipper 80a; loading desired quantities and types of utensils into the utensil tray 45; installing the utensil tray 45 within the upper enclosure assembly 40 by unzipping the second zipper 80b; lifting a flap portion 44 of the upper enclosure assembly 40 upward; inserting the utensil tray 45; closing and securing the flat 44 by closing the second zipper 80b; and, extending and locking the pull handle assembly 50 as previously described. The apparatus 10 is now ready for use.

The method of utilizing the apparatus 10 may be achieved by performing the following steps: transporting the apparatus 10 to a delivery and/or serving area using the pull handle assembly 50 and caster 26 portions; returning the apparatus 10 to an upright position upon the caster 26 and leg 27 portions; unzipping the second zipper 80b and lifting a flap portion 44 of the upper enclosure assembly 40; removing the utensil tray 45; collapsing the pull-handle assembly 50 as previously described; releasing the upper enclosure assembly 40 from the lower enclosure assembly 20 by opening the first zipper 80a and pivoting the upper enclosure assembly 40 upwardly and rearwardly; removing the side padding blocks 70a, 70b, front padding block 72a, and rear padding block 72b portions; allowing the slow cooker 100 to remain within the apparatus 10, as needed, by connecting electric power to the slow cooker 100 using the electrical cord aperture 37; or lifting the slow cooker 100 from the lower enclosure assembly 20 to perform normal serving; removing the locking band 90 from the slow cooker handles 101; and, benefiting from reduced effort during transport, and reduced risk of spillage while transporting a slow cooker 100, afforded a user of the present invention 10.

The foregoing embodiments of the disclosed chest cooler have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

The invention claimed is:

1. An apparatus for transporting a container, comprising:
    a lower enclosure adapted to accept and retain said container;
    an insulating lining disposed on an inner surface of said lower enclosure;
    a plurality of padding blocks disposed within said lower enclosure and adapted to encompass said container and prevent movement of said container within said lower enclosure during transport;
    an upper enclosure hingedly affixed to said lower enclosure and adapted to close upon and seal said lower enclosure;
    a utensil tray disposed within and removable from said upper enclosure;
    a handle assembly attached to said lower enclosure; and,
    at least one pair of wheels operatively attached to a bottom surface of said lower enclosure;
    wherein said handle assembly is selectively movable between a deployed position and stowed position.

2. The apparatus of claim 1, wherein said upper enclosure further comprises:
    an upper enclosure base;
    an upper enclosure material disposed over said upper enclosure base defining an upper inner cavity; and,
    an upper enclosure flap operatively disposed within said upper enclosure material and operative to open to allow access to said upper inner cavity.

3. The apparatus of claim 2, wherein said upper enclosure flap is operatively connected to said upper enclosure material by a zipper.

4. The apparatus of claim 1, wherein said lower enclosure further comprises:
    a first side panel and a second side panel disposed opposite and parallel to each other;
    a front panel and a rear panel disposed opposite and parallel to each other and perpendicular to said first and second side panels; and,
    a bottom panel planerly perpendicular and affixed to said first side panel, said second side panel, said front panel, and said rear panel;
    wherein said first side panel, said second side panel, said front panel, said rear panel and said bottom panel form a box shaped structure defining a lower inner cavity;
    wherein said lower inner cavity is adapted to accept and retain said container for transport; and,
    wherein said insulated lining is connected to an inner surface of each of said first side panel, said second side panel, said front panel, said rear panel and said bottom panel.

5. The apparatus of claim 1, wherein said insulated lining comprises polystyrene.

6. The apparatus of claim 1, wherein said lower enclosure further comprises a louver-type vent.

7. The apparatus of claim 1, further comprising a locking band selectively configured to be connected to handles of said container over top of a lid of said container to secure said lid on said container during said transport.

8. The apparatus of claim 1, wherein said handle assembly further comprises:
    a handle case disposed upon said lower enclosure;
    a first and a second lower handle section, each slidingly disposed within said handle case;
    a first and a second upper handle section, each slidingly disposed within said first and said second lower handle sections respectively;
    a pull handle member perpendicular to, and affixed to, each said upper handle sections;
    wherein said first and said upper handle sections are collapsible within said first and said second lower handle sections respectively; and,
    wherein first and said lower handle sections are collapsible within said handle case.

9. The apparatus of claim 8, wherein said pull handle further comprises a plurality of integral finger reliefs.

10. An apparatus for transporting a container, comprising:
    a lower enclosure defining a lower inner cavity and adapted to accept and retain said container within said lower inner cavity;
    an insulating lining disposed on an inner surface of said lower enclosure;
    a plurality of padding blocks disposed within said lower inner cavity and adapted to encompass said container and prevent movement of said container within said lower enclosure during said transport;
    an upper enclosure defining an upper inner cavity and hingedly affixed to said lower enclosure and adapted to close upon and seal said lower enclosure;
    a utensil tray disposed within and removable from said upper inner cavity;
    a collapsible handle assembly attached to said lower enclosure; and,
    at least one pair of wheels operatively attached to a bottom surface of said lower enclosure;

wherein said collapsible handle assembly is selectively movable between a deployed position and a stowed position.

11. The apparatus of claim 10, wherein said upper enclosure further comprises:
   an upper enclosure base;
   an upper enclosure material disposed over said upper enclosure base; and,
   an upper enclosure flap operatively disposed within said upper enclosure material and operative to open to allow access to said upper inner cavity.

12. The apparatus of claim 11, wherein said upper enclosure flap is operatively connected to said upper enclosure material by a zipper.

13. The apparatus of claim 10, wherein said insulating lining comprises polystyrene.

14. The apparatus of claim 10, further comprising an elastic locking band selectively configured to be connected to handles of said container over top of a lid of said container to secure said lid on said container during said transport.

15. The apparatus of claim 10, wherein said handle assembly further comprises:
   a handle case disposed upon said lower enclosure;
   a first and a second lower handle section, each slidingly disposed within said handle case;
   a first and a second upper handle section, each slidingly disposed within said first and said second lower handle sections respectively;
   a pull handle member perpendicular to, and affixed to, each said upper handle sections;
   wherein said first and said upper handle sections are collapsible within said first and said second lower handle sections respectively; and,
   wherein first and said lower handle sections are collapsible within said handle case.

16. An apparatus for transporting a container, comprising:
   a lower enclosure comprising a plurality of rigid panels defining a lower inner cavity and adapted to accept and retain said container within said lower inner cavity;
   an insulated lining connected to an inner surface of said plurality of panels;
   a locking band disposed within said lower inner cavity and selectively configured to be connected to handles of said container over top of a lid of said container;
   a plurality of padding blocks disposed within said lower inner cavity and adapted to encompass said container and prevent movement of said container within said lower enclosure during said transport;
   a louver-type vent disposed through at least one of said plurality of panels;
   an upper enclosure defining an upper inner cavity and hingedly affixed to said lower enclosure and adapted to close upon and seal said lower enclosure;
   an upper enclosure flap operatively disposed within said upper enclosure and operative to open to allow access to said upper inner cavity;
   a utensil tray disposed within and removable from said upper inner cavity;
   a collapsible handle assembly attached to said lower enclosure; and,
   at least one pair of wheels operatively attached to a bottom surface of said lower enclosure;
   wherein said collapsible handle assembly is selectively movable between a deployed position and a stowed position.

\* \* \* \* \*